Oct. 19, 1965  R. H. RILEY, JR., ET AL  3,213,305
HEAVY-DUTY INDUSTRIAL-TYPE BATTERY POWERED ELECTRIC DRILL
Filed March 5, 1962  3 Sheets-Sheet 1
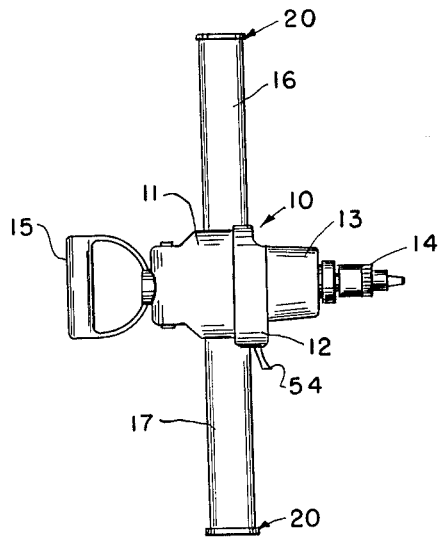
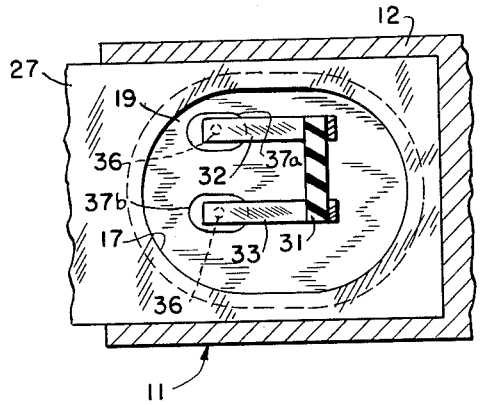
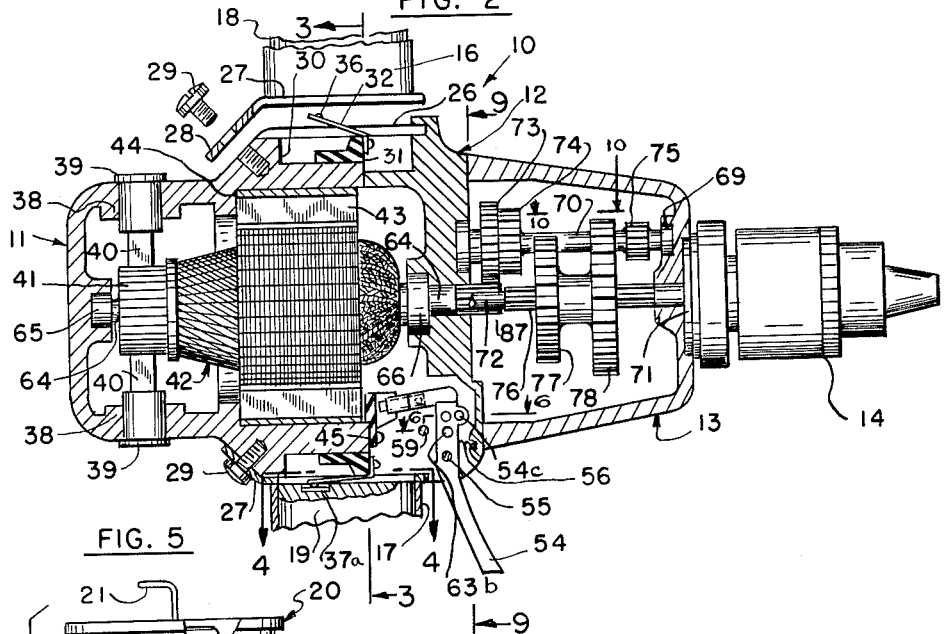
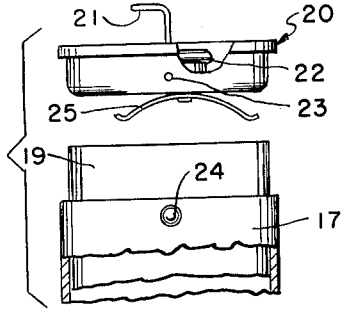
INVENTORS
ROBERT H. RILEY, JR.
DANIEL M. ELLIGSON
BY
ATTORNEY Oct. 19, 1965    R. H. RILEY, JR., ETAL    3,213,305
HEAVY-DUTY INDUSTRIAL-TYPE BATTERY POWERED ELECTRIC DRILL
Filed March 5, 1962    3 Sheets-Sheet 2
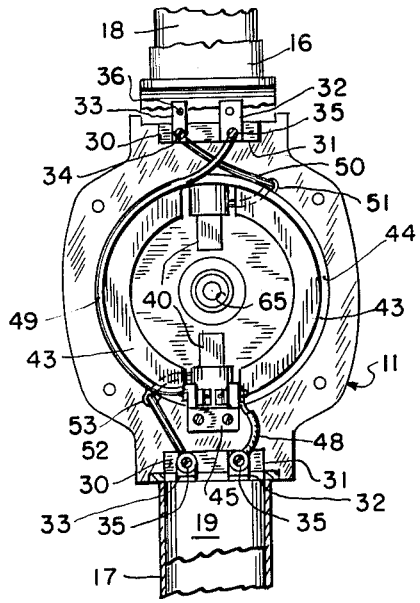
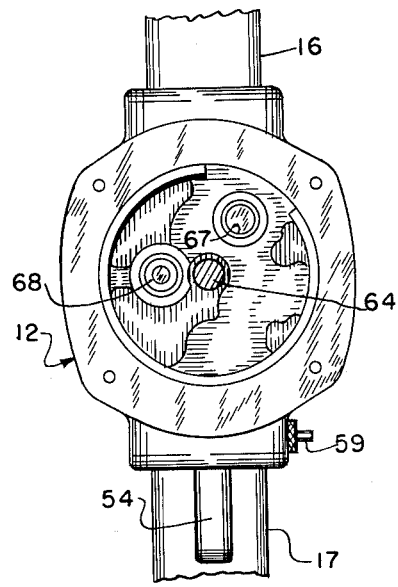
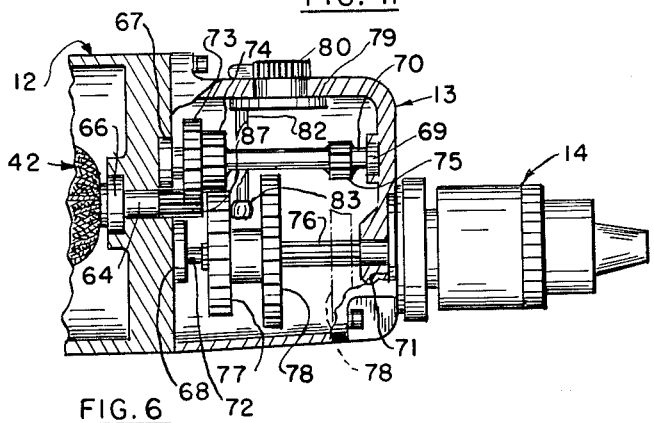
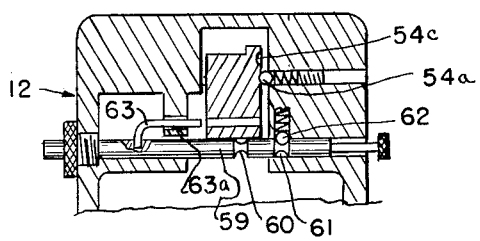
INVENTORS
ROBERT H. RILEY, JR.
DANIEL M. ELLIGSON
BY
*Leonard Bloom*
ATTORNEY

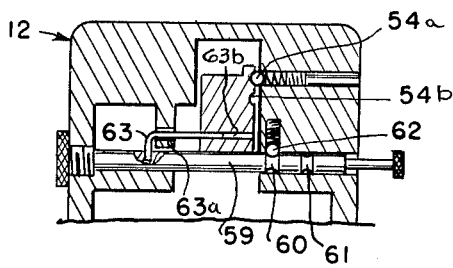
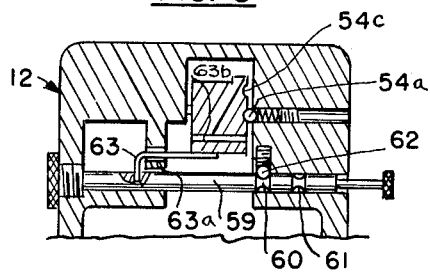
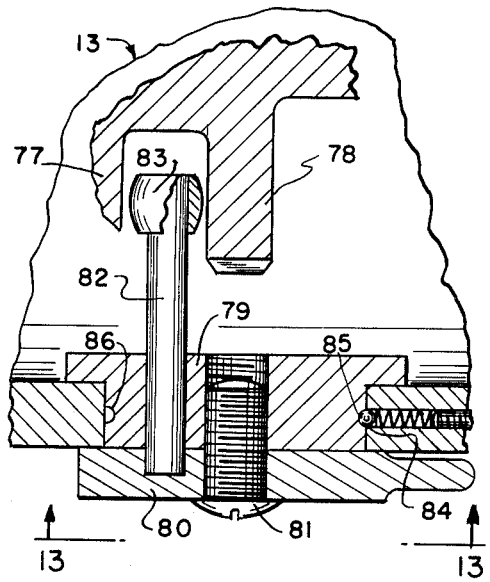
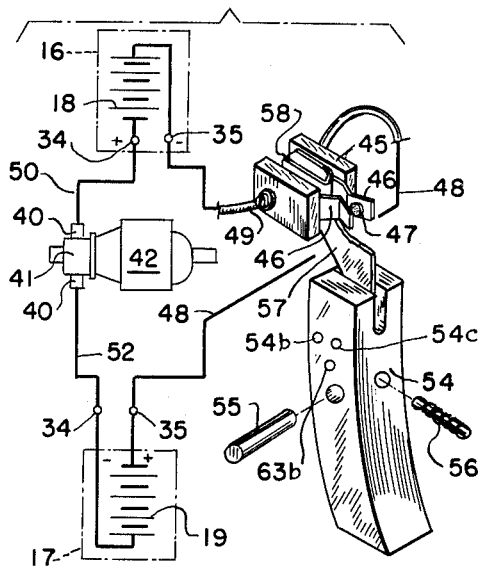
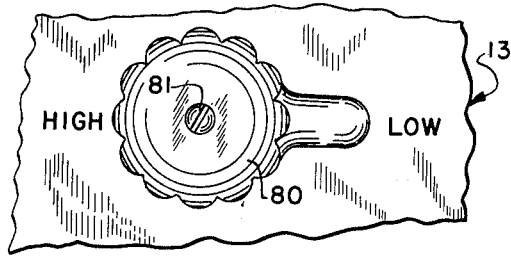

3,213,305
HEAVY-DUTY INDUSTRIAL-TYPE BATTERY POWERED ELECTRIC DRILL
Robert H. Riley, Jr., Towson, and Daniel M. Elligson, Baltimore, Md., assignors to The Black and Decker Manufacturing Company, Towson, Md., a corporation of Maryland
Filed Mar. 5, 1962, Ser. No. 177,316
4 Claims. (Cl. 310—50)

The present invention relates to a heavy-duty industrial-type cordless electric drill, and more particularly, to such a drill that has an output torque approximately equivalent to that of a conventional half-inch electric drill.

In the art relating to battery-operated cordless electric drills, a significant breakthrough was established in the prior developments and reductions to practice which culminated in the co-pending Butler et al. application, Ser. No. 102,819, filed April 13, 1961, entitled "High-Efficiency Cordless Electric Drill," and assigned to the same assignee as that of the present invention. In the aforementioned Butler et al. application, a cordless electric drill was described which was designed as an approximate equivalent to the standard quarter-inch light-duty portable electric drill, one that was suitable for a variety of light-duty jobs around the home, farm, or shop, or on a boat.

The present invention, on the other hand, is designed for a variety of heavy-duty jobs, such as is encountered in industrial applications, or such as is usually performed by contractors, builders, maintenance men, or workers on telephone or telegraph poles. The present invention will fulfill these heavy-duty requirements, and consequently represents a further extension in the art, one that is indeed a significant step forward.

For example, drilling tests made with a preliminary model of the present invention showed, among other data hereinafter to be detailed, that a total of 567 holes, ¾" in diameter and 2" deep, could be drilled in a dressed fir plank prior to requiring that the batteries be replaced with a recharged set of batteries. The drill, with its original set of batteries, was operated continuously for 1 hour, 16 minutes, while the recorded time for the actual drilling was 0.07 minute per hole, or roughly, a little over 4 seconds for a hole ¾" in diameter and roughly 2" deep.

It is an object of the present invention to provide a heavy-duty industrial-type cordless electric drill, one that has a half-inch capacity in steel, and one that has approximately the same output torque as that of a conventional half-inch electric drill.

It is another object of the present invention to provide a cordless electric drill that is capable of sustained drilling operations for appreciable periods of time under a variety of heavy-duty applications.

It is yet another object of the present invention to provide a heavy-duty cordless electric drill that is rugged and reliable and capable of being used under relatively-adverse conditions.

It is yet still another object of the present invention to provide a heavy-duty industrial-type cordless electric drill that utilizes a pair of readily-removable battery packs, each of which comprise a series of rechargeable energy cells.

It is a further object of the present invention to provide a heavy-duty industrial-type cordless electric drill that includes a pair of aligned substantially-hollow elongated handles secured to the field case, one on each side thereof, in combination with a slide-out battery pack in each of the handles.

It is a yet further object of the present invention to provide a heavy-duty industrial-type cordless electric drill that has a pair of aligned substantially-hollow elongated handles secured to the field case, each of the handles having respective open ends remote from the field case, in combination with a slide-out battery pack in each of the handles and a quick-release cover means for each of the open ends of the respective handles.

It is a yet still further object of the present invention to provide a heavy-duty industrial-type cordless electric drill that has electrical means to connect the pair of battery packs in series with each other and with a direct current electric motor that is housed in the field case of the drill, in combination with a manually-manipulated trigger switch in the electrical means.

It is again another object of the present invention to provide a heavy-duty industrial-type cordless electric drill that may be operated either by a pair of 6-cell battery packs, or by a pair of 9-cell battery packs, wherein only the wound laminated armature and the gearing need be changed, and wherein the remainder of the drill, including the field case, permanent magnetic field, gear case, gear case cover, and electrical inter-connection means, is constant and need not be changed.

It is again yet another object of the present invention to provide, for use with a heavy-duty cordless electric drill, a manually-manipulatable trigger switch pivotally supported within the drill, in combination with means to lock the switch both in its "on" position as well as in its "off" position.

It is again a further object of the present invention to provide a heavy-duty industrial-type cordless electric drill that is safe from the hazards of electrical shock, even when the drill is operated under ordinarily dangerous conditions.

In accordance with a preferred embodiment made in accordance with the teachings of the present invention, there is provided a heavy-duty industrial-type cordless electric drill having a field case, a gear case cover secured forwardly of the field case, and a gear case secured forwardly of the gear case cover, the overall assembly having a substantially longitudinal axis. An output spindle is journaled in the gear case and protrudes forwardly therefrom, and a conventional chuck is coupled to the spindle. The field case houses a direct current electric motor. The motor includes an armature having a shaft that protrudes through the gear case cover and into the gear case, and means are provided within the gear case to couple the armature shaft to the output spindle. A pair of substantially hollow elongated handles are secured to the field case, one on each side thereof. The handles are aligned with each other and are transverse to the longitudinal axis of the overall assembly. Each of the handles has an open end remote from the field case, and a slide-out battery pack is inserted through the open end of each of the handles. Quick-release cover means are provided for the open end of each of the handles, whereby the battery pack may be readily removed and replaced with a recharged battery pack. Each of the battery packs has a respective pair of terminals comprising a positive terminal and a negative terminal. A switch is provided. The switch includes a manually-manipulatable trigger that is carried by the gear case cover and depends therefrom, and electrical means are provided to engage the respective terminals of each battery and to place the batteries in series with each other and in series with the motor and the switch.

These and other objects of the present invention will become apparent from a reading of the following specification, taken in conjunction with the enclosed drawings, in which:

FIGURE 1 is a side elevation of the heavy-duty industrial-type cordless electric drill;

FIGURE 2 is an enlarged longitudinal section with parts broken away and sectioned, the handles being shown only partially to conserve space, the top handle being shown in exploded relationship to the field case and the removable battery pack and the electrical conductors or leads being omitted for ease of illustration;

FIGURE 3 is a view taken along the lines 3—3 of FIGURE 2 looking rearwardly into the field case, the armature being removed for convenience of illustration and the electrical conductors being shown in elevation;

FIGURE 4 is a sectional view taken along the lines 4—4 of FIGURE 3, showing the means for mounting one of the handles to the field case;

FIGURE 5 is a fragmentary elevation of the lower or outer part of one of the handles, showing in exploded view, the battery pack and the cover means to retain the battery pack within the handle;

FIGURE 6 is a section taken along the lines 6—6 of FIGURE 2, showing the means for locking the pivoted trigger either in the "on" position or in the "off" position;

FIGURE 7 is a view corresponding to a portion of FIGURE 6, but showing the pivoted trigger locked in its "off" position;

FIGURE 8 is a view corresponding to a portion of FIGURE 6, but showing the pivoted trigger locked in its "on" position;

FIGURE 9 is a section taken along the lines 9—9 of FIGURE 2 looking rearwardly into the gear case cover, the armature being removed for convenience of illustration;

FIGURE 10 is a section taken along the lines 10—10 of FIGURE 2, showing the shifting means of the two-speed transmission;

FIGURE 11 is a plan layout of the transmission;

FIGURE 12 is a schematic view showing the pivoted trigger and associated switch contacts in perspective, and further showing the electrical inter-connection; and FIGURE 13 is a view taken along the lines 13—13 of FIGURE 10, showing the external appearance of the shift lever.

With reference to FIGURES 1 and 2, there is illustrated a heavy-duty industrial-type cordless electric drill 10 (of the half-inch type) having a motor housing usually referred to as a field case 11, a gear case cover 12 secured forwardly of the field case 11, a gear case 13 secured forwardly of the gear case cover 12, a conventional chuck 14, an end handle 15, and a pair of elongated side handles 16 and 17 secured respectively on opposite sides of the field case 11. The overall assembly of the field case 11, gear case cover 12, and gear case 13 is generally cylindrical and has a substantially longitudinal axis, while the side handles 16 and 17, which are aligned with each other, are transverse to the longitudinal axis of the assembly.

With reference to FIGURES 2 and 5, each of the handles 16 and 17 comprises a substantially-hollow battery case within which a slide-out battery 18 and 19, respectively, is received. The battery 18 (or 19) may be formed as an integral battery pack comprising a series of interconnected rechargeable energy cells of the nickel-cadmium or silver-cadmium type. Each of slide-out battery packs 18 or 19 is slidably received within its respective hollow handle and is held in place by means of an identical cover member 20. The cover member 20 carries a locking spring 21 as well as a locking post 22. The locking spring 21 cooperates with the locking post 22 to cause a pair of feet formed on the locking spring 21 to be received within a pair of respective dimpled recesses formed in the handle 17. One of the feet is shown in end view as at 23, while its respective cooperating recess is shown as at 24. Moreover, the cover member 20 carries a leaf spring 25 which engages the bottom of each of the battery packs to insure good electrical contact together with firm mechanical rigidity. The cover member 20 is described more particularly in the co-pending Riley et al. application Ser. No. 177,467, filed March 5, 1962, entitled "End Portion Construction for Handle of Cordless Electric Device Having a Slide-Out Battery Pack," and assigned to the assignee of the present invention.

With reference to FIGURES 2, 3, and 4, the field case 11 has a pair of flange recesses 26 within which the top flange portion 27 of the handles 16 and 17 are received. The flange 27 has an upturned rearward portion 28 which is secured to the field case 11 by means of a screw 29. A further recess 30 is formed in the field case 11 radially inwardly of the flange recess 26, and an insulated block 31 is secured therein both at the top and bottom of the field case 11. A pair of leaf-spring contacts 32 and 33 are secured to the block 31 by means of respective terminals 34 and 35. Each of the contacts 32 and 33 has a high-conductivity contact button 36 secured thereto for engagement with the respective battery terminals 37a and 37b. A pair of aligned bosses 38 are formed in the rearward portion of the field case 11, and suitable brushholders 39 are retained therein by conventional means. Each of the brushholders 39 has a high-conductivity brush 40 slidably supported therein. The brushes 40 are made of silver-graphite or other suitable material. The brushes 40 ride upon the commutator 41 of the wound laminated armature 42, as shown in FIGURE 2. A field assembly is retained within the field case 11 by suitable means. The field assembly comprises a pair of permanently-magnetic tubular segments 43 retained within an outer concentric sleeve 44 by adhesive or other suitable means. The field assembly and the wound laminated armature 42 comprise a high-efficiency direct current electric motor, which is described more particularly in the co-pending Riley et al. application Ser. No. 156,625, filed December 4, 1961, and assigned to the same assignee as that of the present invention.

With reference to FIGURES 2, 3, and 12, a U-shaped insulated block 45 is secured to the face of the field case 11 adjacent to the lower insulated block 31; and it will be appreciated that when the field case 11 is secured to the gear case cover 12, that the block 45 will be received partially within the gear case cover 12. The block 45 carries complementary leaf-spring switch contacts 46 having oppositely-facing high-conductivity buttons 47 secured thereto. The buttons 47, like the contact buttons 36, are made of a silver alloy, such as a silver cadmium oxide, or other suitable material. A lead 48 runs between lower terminal 35 and one of the contacts 46. A second lead 49 runs from the other contact 46 to upper terminal 35. A third lead 50 runs from upper terminal 34 (down through a longitudinal slot 51) to one of the brushes 40. Finally, a fourth lead 52 runs from the other of the brushes 40 (via a longitudinal slot 53) to the lower of the terminals 34. Consequently, it will be appreciated that the electrical circuit is such that the battery packs 18 and 19, together with the brushes 40 and the switch contacts 46, and of course the commutator 41, are all in series with each other.

With reference to FIGURES 2, 6, and 12, the gear case cover 12 carries a pivoted switch trigger 54. The trigger 54 is pivoted upon a stationary pin 55 and is spring-loaded by means of a spring 56. Moreover, a spring-loaded detent 54a is carried by the gear case cover 12 and is adapted to be received within either of a pair of pockets 54b and 54c, thus allowing the pivoted trigger 54 to have a "snap action." The upper part of the trigger 54 carries an insulated support 57, which supports a high-conductivity switch contact 58. Consequently, it will be appreciated that the pivoted trigger 54 may be engaged by the operator such that the contact 58 moves forwardly of the drill 10 to engage intermediately of the contact buttons 47, thus completing the circuit and energizing the drill 10. When the pivoted trigger 54 is released by the operator, however, it returns to its normal position as illustrated in FIGURES 2 and 12, with the insulated support 57 now being intermediate of the contact buttons to preclude their engagement with each other and to preclude arcing and consequent burning of the contacts.

With reference again to FIGURES 2 and 6, and with reference to FIGURES 7 and 8, the switch trigger 54 is adapted to be locked either in the "on" position or in the "off" position by the following means: The gear case cover 12 carries a sliding transverse pin 59, which has a pair of external annular grooves 60 and 61 formed thereon. The grooves 60 and 61 are adapted to cooperate with a spring-loaded detent 62, which is trapped within the gear case cover 12. The sliding pin 59 has two alternate positions corresponding to an unlocking position and a locking position. The pin 59 carries an L-shaped locking member 63. The locking member 63 is slidably guided within a hole 63a formed in the gear case cover 12, thereby preventing rotation of the sliding pin 59. In the unlocked position of the pin 59, the locking member 63 is out of engagement with the trigger 54; and as shown in FIGURE 6, the trigger 54 is free to pivot. However, when it is desired to lock the trigger 54, say in the "off" position as shown in FIGURE 7, the sliding pin 59 is moved transversely such that the detent 62 engages the other groove 60, and such that the L-shaped locking member 63 is received within a hole 63b formed in the trigger 54. Consequently, the pin 59 prevents any movement of the trigger 54, it being noted that the switch contact 58 is already out of engagement with the contact buttons 47. Conversely, when it is desired to lock the trigger 54 in the "on" position, as when it is desired to perform a sustained drilling operation, the switch trigger 54 is first pivoted such that the switch contact 58 is in engagement with the contact buttons 47, thus energizing the drill 10. Then the sliding pin 59 is moved from its unlocked position to its locking position. In this manner, as shown more particularly in FIGURE 8, the locking member 63 is placed up against the face of the trigger 54 and prevents the further movement or disengagement of the trigger 54. Thus the drill 10 is maintained in the "on" position until the sliding pin 59 is returned to the normal or unlocking position of FIGURE 6.

The trigger locking means desired herein is the subject of the co-pending Elligson application Ser. No. 252,761, filed January 21, 1963, entitled "Trigger Locking Means for Portable Electric Device," and assigned to the assignee of the present invention.

With reference to FIGURES 2, 9, 10, 11 and 13, the armature 42 has an armature shaft 64 which is journaled fore and aft in bearings 66 and 65. Bearing 65 is retained in the rearward portion of field case 11, while bearing 66 is retained in the gear case cover 12. The gear case cover 12, as shown more particularly in FIGURE 9, supports two other bearings 67 and 68. Bearing 67, together with a bearing 69 retained in the front portion of the gear case 13, supports an intermediate shaft 70. Bearing 68, together with another bearing 71 retained in the front portion of the gear case 13, supports the output spindle 72 to which the chuck 14 is secured. The intermediate shaft 70 carries an intermediate gear 73; and a pair of spaced-apart pinions 74 and 75 are formed integrally on the intermediate shaft 70. The output spindle 72 has a splined portion 76 which carries an internally-splined slidable gear cluster comprising output gears 77 and 78. An eccentric shaft 79 is supported within the gear case 13 along an axis transverse to the axes of the intermediate shaft 70 and the output spindle 72. An external shift lever 80 (see FIGURE 13) is secured to the eccentric shaft 79 as by means of a screw 81. The eccentric shaft 79 and the shift lever 80 carry an eccentric pin 82, and the pin 82 carries a roller 83 which is disposed intermediate of the output gears 77 and 78. The assembly of the eccentric shaft 79 and shift lever 80 is adapted to be rotated through an angle of approximately 180 degrees from one position to another. A spring-loaded detent 84 is carried by the gear case 13 and cooperates with a pair of external pockets 85 and 86 formed on the eccentric shaft 79 oppositely from one another, thus providing a "snap action" to the movement of the shift lever 80.

Accordingly, it will be appreciated that a two-speed transmission is provided which operates in the following manner: In FIGURE 11, the transmission is in its "high" speed position. The entire gear cluster is in its extreme rearward position on the splined portion 76 of the output spindle 72, and gear 77 is in engagement with pinion 74 carried by the intermediate shaft 70. The drive is thus through the armature pinion 87, intermediate gear 73, intermediate shaft 70, pinion 74, and output gear 77 to the ouput spindle 72. In order to shift from the "high" speed position to the "low" speed position, the shift lever 80 is rotated approximately 180 degrees, such that the eccentric shaft 79 and eccentric pin 82 are in turn rotated to their opposite position. The roller 83 engages the inner face of the output gear 78, thus sliding the entire gear cluster forwardly along the splined portion 76 of the output spindle 72. Consequently, gear 77 is taken out of engagement with pinion 74, and gear 78 is now brought into engagement with pinion 75. The drive is now transmitted through armature pinion 87, intermediate gear 73, intermediate shaft 70, pinion 75, and output gear 78 to the output spindle 72. Conversely, to shift back to the "high" speed position, the shift lever 80 is rotated in the opposite direction, such that the roller 83 now engages the inner face of the other output gear 77, thus sliding the entire gear cluster rearwardly along the splined portion 76 of the output spindle 72 until gear 77 is back in engagement with pinion 75. The two-speed transmission herein described is the subject of the copending Riley et al. application, Ser. No. 177,316, filed March 5, 1962, entitled "Two-Speed Transmission for Portable Electric Tool," and assigned to the assignee of the present invention.

In one physical embodiment of the present invention, representing a practical working model of a ½″ heavy-duty cordless electric drill ready for commercial production, the output speed of the chuck (in the "high" speed position of the transmission) is 550 r.p.m., while the "low" speed position is 225 r.p.m. The output torque of the chuck is 28 foot pounds at 225 r.p.m. The ½″ cordless electric drill is powered by two battery packs having 9-cells each for a total of 18 cells in series with each other. Each of the cells is a silver-cadmium rechargeable energy cell. The battery packs may be recharged after run-down, and as previously indicated, the packs may be quickly removed by first lifting off the covers 20 from their respective handles. The total voltage of all 18 cells is in the order of roughly 25 volts, making the drill 10 safe for operation under ordinarily hazardous conditions, such as in boat maintenance and repair. Moreover, the drill 10 has a wound laminated armature, which preferably has 10 turns of No. 18 wire, for a total of 20 conductors, in each of its 16 winding slots.

Some of the preliminary test data that has already been obtained with a practical pre-production model may be outlined as follows:

First, sustained drilling operations were performed on a fir plank 2″ thick. A 2 9/16″ diameter wood bit was used. The drill was placed in the "low" speed position. A total of 89 holes were drilled prior to complete run-down of the batteries. The holes were drilled continuously, one after another, with no appreciable pause between holes. Two operators were used, one relieving the other. Each of the holes was drilled in about the same time. The 89th hole was drilled just about as fast as the first one, the capacity or output of the batteries falling off all at once.

Second, in another test, with the battery packs recharged, and again with the drill in "low" speed position, a total of 436 holes, ¾″ diameter, were drilled in a new 2″ fir plank prior to battery run-down. The recorded time for drilling each of the 436 holes was 0.15 minute, or 6 seconds, per hole.

Third, and again in 2″ fir, but with the drill in its "high" speed position, a total of 567 holes, ¾″ diameter, were drilled. The recorded time for drilling out each hole was 0.07 minute per hole, or roughly a little over 4 seconds per hole, as previously noted. The drill was operated continuously for 1 hour, 16 minutes.

Fourth, 4″ fir planks were used. The drill was put in its "low" speed position. A total of 203 ¾″ diameter holes were drilled.

Fifth, drilling tests in metal were conducted. In cold rolled steel, ¼″ thick, with the drill in "low" speed, ½″ diameter holes were drilled using an ordinary twist drill. A total of 130 holes were drilled prior to complete battery discharge. The recorded drilling time per hole was 0.3 minute, or 18 seconds per hole. The drill was operated continuously for 1 hour, 35 minutes.

Sixth, and again in ¼″ cold rolled steel, with the drill in "high" speed, a total of 206 ¼″ diameter holes were drilled using an ordinary twist drill. The recorded time for actual drilling was 0.4 minute per hole, or 24 seconds per hole. In this test, the drill was operated continuously for an overall total of two hours, 25 minutes.

The above data is indicative of the capacity and performance of the heavy-duty industrial-type cordless electric drill of the present invention; and the data, which is fully substantiated, has been cited herein to illustrate that the present invention has provided a heavy-duty truly-cordless electric drill, one that is practical and feasible and fully meets the stated objects of the present invention, and one that has actually extended the state of the art to new boundaries heretofore considered unattainable by others in the field.

Obviously, many modifications may be made without departing from the basic spirit of the present invention; and accordingly, it will be appreciated that within the scope of the appended claims, the invention may be practiced other than has been specifically described.

We claim:

1. A heavy-duty industrial-type cordless electric drill, comprising in combination:
    (a) a field case;
    (b) a gear case cover secured forwardly of said field case;
    (c) a gear case secured forwardly of said gear case cover, whereby said gear case, said gear case cover, and said field case have a longitudinal axis;
    (d) an output spindle journaled in said gear case and protruding forwardly therefrom;
    (e) a direct current electric motor in said field case;
    (f) said motor including an armature having a shaft protruding through said gear case cover into said gear case;
    (g) gearing means in said gear case to couple said armature shaft to said output spindle;
    (h) a pair of substantially-identical hollow elongated handles secured to said field case, one on each side thereof;
    (i) said handles being mutually-aligned with each other and being transverse with respect to the longitudinal axis;
    (j) a removable battery in each of said handles;
    (k) each of said batteries having a pair of terminals;
    (l) a switch having an "on" position and an "off" position and including a manually-manipulatable trigger having a portion disposed forwardly of one of said handles and adapted for movement in a plane parallel to the longitudinal axis of the tool;
    (m) means including a locking member journaled for sliding movement transversely to the plane of movement of said trigger to lock said trigger, selectively, in each of said switch positions; and
    (n) electrical means placing said batteries in series with each other and with said motor and said switch.

2. The combination according to claim 1, wherein:
    (a) each of said handles has a top flange portion;
    (b) a pair of complementary recesses formed in said field case, one at the top and the other at the bottom thereof, to receive said flange portion of said respective handles;
    (c) said flange having an upturned rearward portion extending rearwardly of said recess and lying flush against the surface of said field case; and
    (d) means including a screw passing through said upturned rearward portion of said flange to detachably secure said handle to said field case.

3. The combination according to claim 1, wherein said electrical means comprises:
    (a) a pair of recesses formed in said field case, one at the top of the field case and the other at the bottom of the field case;
    (b) each of said recesses being adjacent to a respective one of said pair of handles;
    (c) insulated supports secured within said recesses;
    (d) a pair of leaf-spring battery contacts secured to each of said supports and projecting rearwardly therefrom, whereby said battery contacts comprise a lower pair of battery contacts and an upper pair of battery contacts;
    (e) a high-conductivity contact button secured to each of said battery contacts and depending therefrom for engagement with said respective battery terminals;
    (f) a pair of high-conductivity electrical brushes carried by said field case and engaging said armature;
    (g) an insulated block secured to said field case adjacent to said insulated support which carries said lower pair of battery contacts;
    (h) a pair of switch contacts carried by said insulated block;
    (i) a high-conductivity contact button secured to each of said pair of switch contacts;
    (j) said last-named contact buttons being oppositely-disposed with respect to each other;
    (k) a lead from one of said lower battery contacts to one of said switch contacts;
    (l) a lead from the other of said lower battery contacts to one of said brushes;
    (m) a lead from the other of said brushes to one of said upper battery contacts; and
    (n) a lead from the other of said upper battery contacts to the other of said switch contacts.

4. A cordless electric tool, comprising:
    (a) a motor housing having a direct-current electric motor;
    (b) said motor comprising a field and an armature having a commutator and electrical brushes engaging said commutator;
    (c) a substantially-hollow elongated housing secured transversely of said motor housing;
    (d) a battery in said elongated housing, said battery having a pair of terminals;
    (e) a switch having an "on" position and an "off" position and comprising a manually-manipulatable member and at least one pair of switch contacts closed by said member;
    (f) means to electrically connect said switch contacts in series with said battery terminals and with said brushes; and
    (g) means to lock said switch, selectively, in each of its positions;
    (h) said last-named means comprising a locking member keyed to one of said housings and journaled therein for sliding movement transversely of the plane of movement of said switch member, whereby in the "on" position of said switch, said locking member may be moved transversely to key said switch member to said housing to maintain said switch in its "on" position, and whereby in the "off" position of said switch, said locking member may be moved transversely to preclude movement of said switch member, thereby preventing said switch contacts from being closed.

References Cited by the Examiner

UNITED STATES PATENTS

| | | | |
|---|---|---|---|
| 873,123 | 12/07 | Gardy | 310—50 X |
| 988,214 | 3/11 | Sherwood | 310—50 X |
| 1,445,294 | 2/23 | Camp | 310—50 X |
| 1,711,520 | 5/29 | Decker | 310—50 X |
| 1,754,222 | 4/30 | Connell | 310—50 X |
| 2,346,778 | 4/44 | Mitchell | 310—50 X |
| 2,350,631 | 6/44 | Mitchell | 310—50 X |
| 2,406,389 | 8/46 | Lee | 310—50 X |
| 2,456,571 | 12/48 | Turner | 310—50 X |
| 2,468,469 | 4/49 | Smith | 310—50 X |
| 2,525,839 | 10/50 | Sparklin | 310—50 X |
| 2,730,635 | 1/56 | McCabe | 310—50 X |
| 2,744,176 | 5/56 | Kaman | 310—50 X |
| 2,829,285 | 4/58 | Steiner | 310—50 |
| 2,867,039 | 1/59 | Zach | 310—47 X |
| 2,976,436 | 3/61 | Anton | 310—50 X |
| 2,987,636 | 6/61 | Jepson | 310—50 X |
| 3,077,547 | 2/63 | Metko | 310—50 X |

FOREIGN PATENTS

| | | |
|---|---|---|
| 626,113 | 8/61 | Canada. |
| 440,246 | 12/35 | Great Britain. |

ORIS L. RADER, *Primary Examiner.*

MILTON O. HIRSHFIELD, *Examiner.*